United States Patent
Hirschfeld et al.

(10) Patent No.: US 6,880,002 B2
(45) Date of Patent: Apr. 12, 2005

(54) VIRTUALIZED LOGICAL SERVER CLOUD PROVIDING NON-DETERMINISTIC ALLOCATION OF LOGICAL ATTRIBUTES OF LOGICAL SERVERS TO PHYSICAL RESOURCES

(75) Inventors: Robert A. Hirschfeld, Metairie, LA (US); Dave D. McCrory, Destrehan, LA (US)

(73) Assignee: Surgient, Inc., Austin, TX (US)

( * ) Notice: Subject to any disclaimer, the term of this patent is extended or adjusted under 35 U.S.C. 154(b) by 319 days.

(21) Appl. No.: 10/100,216

(22) Filed: Mar. 18, 2002

(65) Prior Publication Data

US 2003/0051021 A1 Mar. 13, 2003

Related U.S. Application Data

(60) Provisional application No. 60/317,294, filed on Sep. 5, 2001.

(51) Int. Cl.[7] ............................................. G06F 15/173
(52) U.S. Cl. ....................... 709/223; 709/227; 709/250; 709/225; 709/229; 710/313; 710/72
(58) Field of Search ................................. 710/305–306, 710/311–317, 62–54, 72, 7, 8, 10; 709/200–203, 223–231, 248–250, 328–331; 718/100, 101, 106; 707/100–103

(56) References Cited

U.S. PATENT DOCUMENTS

| | | | | |
|---|---|---|---|---|
| 4,912,628 A | * | 3/1990 | Briggs .......................... | 718/100 |
| 5,062,037 A | * | 10/1991 | Shorter et al. ............... | 718/106 |
| 5,201,049 A | * | 4/1993 | Shorter ........................... | 718/1 |
| 5,611,050 A | | 3/1997 | Theimer et al. | |
| 5,802,290 A | | 9/1998 | Casselman | |
| 5,996,026 A | * | 11/1999 | Onodera et al. ............... | 710/3 |
| 5,999,518 A | | 12/1999 | Nattkemper et al. | |
| 6,003,050 A | * | 12/1999 | Silver et al. ................. | 707/536 |

(Continued)

OTHER PUBLICATIONS

PCT Notification of Transmittal of the International Search Report or the Declaration, dated Feb. 25, 2003, 5 pages.

PCT Notification of Transmittal of the International Search Report or the Declaration, dated Mar. 28, 2003, 3 pages.

Henry Baltazar, Virtual Storage Age, eWEEK, pp. 45 and 48, Aug. 27, 2001, Ziff Davis Media Inc., New York, New York.

*Primary Examiner*—Paul R. Myers
*Assistant Examiner*—Raymond N Phan
(74) *Attorney, Agent, or Firm*—Gary R. Stanford

(57) ABSTRACT

A virtualized logical server cloud that enables logical servers to exist independent of physical servers that instantiate the logical servers. Servers are treated as logical resources in order to create a logical server cloud. The logical attributes of a logical server are non-deterministically allocated to physical resources creating a cloud of logical servers over the physical servers. Logical separation is facilitated by the addition of a server cloud manager, which is an automated multi-server management layer. Each logical server has persistent attributes that establish its identity. Each physical server includes or is coupled to physical resources including a network resource, a data storage resource and a processor resource. At least one physical server executes virtualization software that virtualizes physical resources for logical servers. The server cloud manager maintains status and instance information for the logical servers including persistent and non-persistent attributes that link each logical server with a physical server.

35 Claims, 8 Drawing Sheets

U.S. PATENT DOCUMENTS

| | | | |
|---|---|---|---|
| 6,041,347 A * | 3/2000 | Harsham et al. | 709/200 |
| 6,075,938 A | 6/2000 | Bugnion et al. | |
| 6,104,699 A | 8/2000 | Holender et al. | |
| 6,185,601 B1 | 2/2001 | Wolff | |
| 6,256,637 B1 * | 7/2001 | Venkatesh et al. | 707/103 |
| 6,263,358 B1 | 7/2001 | Lee et al. | |
| 6,272,523 B1 * | 8/2001 | Factor | 709/201 |
| 6,272,537 B1 | 8/2001 | Kekic et al. | |
| 6,282,602 B1 * | 8/2001 | Blumenau et al. | 711/4 |
| 6,347,328 B1 * | 2/2002 | Harper et al. | 718/105 |
| 6,370,560 B1 | 4/2002 | Robertazzi et al. | |
| 6,453,426 B1 * | 9/2002 | Gamache et al. | 714/4 |
| 6,496,847 B1 * | 12/2002 | Bugnion et al. | 709/1 |
| 6,567,839 B1 | 5/2003 | Borkenhagen et al. | |
| 6,571,283 B1 * | 5/2003 | Smorodinsky | 709/220 |
| 6,607,545 B2 | 8/2003 | Kammerer et al. | |
| 6,609,213 B1 * | 8/2003 | Nguyen et al. | 714/4 |
| 6,633,916 B2 | 10/2003 | Kauffman | |
| 6,640,239 B1 | 10/2003 | Gidwani | |
| 6,665,304 B2 * | 12/2003 | Beck et al. | 370/401 |
| 2002/0065864 A1 | 5/2002 | Hartsell et al. | |
| 2002/0103889 A1 * | 8/2002 | Markson et al. | 709/223 |
| 2002/0129082 A1 | 9/2002 | Baskey et al. | |
| 2002/0152310 A1 * | 10/2002 | Jain et al. | 709/226 |

* cited by examiner

VIRTUALIZED LOGICAL SERVER CLOUD PROVIDING NON-DETERMINISTIC ALLOCATION OF LOGICAL ATTRIBUTES OF LOGICAL SERVERS TO PHYSICAL RESOURCES

CROSS-REFERENCE TO RELATED APPLICATION(S)

The present application is based on U.S. Provisional Patent Application entitled "Virtualized Logical Server Cloud", Ser. No. 60/317,294, filed Sep. 5, 2001, which is hereby incorporated by reference in its entirety.

FIELD OF THE INVENTION

The present invention relates to virtualization and server technology, and more particularly to a virtualized logical server cloud that includes logical servers that are non-deterministically linked to physical servers and that may exist independent of specific physical servers.

DESCRIPTION OF RELATED ART

There are many situations in which it is desired to lease one or more server computer systems on a short or long-term basis. Examples include educational or classroom services, demonstration of software to potential users or buyers, website server applications, etc. The servers may be pre-configured with selected operating systems and application software as desired. Although physical servers may be leased and physically delivered for onsite use, servers may also be leased from a central or remote location and accessed via an intermediate network system, such as the Internet. The primary considerations for remote access include the capabilities of the remote access software and the network connection or interface.

Remote access technology is known and many variations exist, such as Microsoft Terminal Server, Citrix MetaFrame, Symantec pcAnywhere, VMware Remote Console, etc. In general, local client software operates on a client computer that enables communication with server software operating on a server computer. Generally, the client software provides keyboard and mouse commands and receives video and audio information and there is little or no local client processing necessary. It is often desired to share a single physical server among multiple users to more efficiently utilize server resources. Many remote access systems enable multiple access by simultaneously activating separate user sessions. Although some files may be shared, other files or directories or even disk drives may have permission-based attributes so that only authorized persons have access. The same may be true for other physical or software resources existing on or coupled to the physical server. Although multiple access to a single physical server has many benefits, it may be desired to provide a greater degree of isolation between or independence among the users for a variety of reasons, such as, for example, improved security. Also, each user may be detrimentally affected by activities of or problems caused by one or more other users. If any user causes accidental or intentional shutdown of the physical computer or any physical resources associated therewith, or uploads a virus or the like, all users may be detrimentally affected.

One solution is the use of virtualization technology that enables multiple logical servers to operate on a single physical computer. Previously, logical servers were tied directly to physical servers because they relied on the physical server's attributes and resources for their identity. Virtualization technology weakened this restriction by allowing multiple logical servers to override a physical server's attributes and share its resources. Virtualization technology is available from several companies, including VMware, Connectix, Compaq and Ensim. Each logical server operates substantially independent of other logical servers and provides virtual isolation among users.

Although virtualization weakened the link between logical and physical servers, logical servers were still bound or otherwise deterministically linked to a specific physical server. The user had to be aware of and have specific information about the underlying physical server to access the logical servers. For example, the user had to provide specific information of the physical server, such as an internet protocol (IP) address or server name and a port number. The user had to further supply a correct uniform resource locator (URL) or pathname to a selected logical server linked to that physical server along with the corresponding user credentials, such as username and password. If any of the access information was input incorrectly, access was denied. A user having permission to access multiple logical servers had to know the specific access information for each including the physical server information. Thus, if two different logical servers were located on two different physical servers, the user had to know the access information for each, including the specific access information for each physical server. If the site administrator managing the physical servers attempted to move the user from one logical server to another logical server located on a different physical server, the user had to be informed of the new access information even if the two logical servers were otherwise identical. Also, if a physical server crashed or became disabled, all of the associated logical servers were inaccessible indefinitely until the physical server was repaired or replaced and brought back online.

Clustering technology is known but is also deterministic. In particular, clustered resources interact within a predetermined and common configuration to change physical resources. Clustering does not solve the problem of isolating logical servers from the underlying physical system. Clustering solves a different problem by employing two or more systems that work together, and generally refers to multiple computer systems that are linked together in order to handle variable workloads or to provide continued operation in the event one fails. A cluster of computer systems provides fault tolerance and/or load balancing. Fault tolerance ensures that one or more systems are still available in the event any one system fails. Load balancing distributes the workload over multiple systems.

It is desired to completely separate logical servers from physical servers so that there is no permanent tie between physical and logical resources. Such separation would allow for physical servers to act as a pool of resources supporting logical servers, so that a logical server may be reallocated to a different physical server without users experiencing any change in access approach even during reallocation. It is desired to remove the requirement of pre-allocation of physical resources prior to a physical resource change as is required by clustering.

SUMMARY OF THE PRESENT INVENTION

A virtualized logical server cloud according to an embodiment of the present invention includes a plurality of logical servers, a network system, a plurality of physical servers and a server cloud manager. Each logical server has persistent attributes that establish its identity. Each physical server is coupled to physical resources including a network resource for interfacing the network system, and each physical server includes a data storage resource and a processor resource. The data storage resource may include both volatile and non-volatile resources. Each physical server executes virtualization software that virtualizes physical resources for logical servers linked to that physical server. The server cloud manager establishes and maintains status and instance information for the logical servers including the persistent and any non-persistent attributes that link each logical server with a physical server.

The virtualized logical server cloud may include a user database that includes mapping information between users, the logical servers and the physical servers. The server cloud manager may include a user interface that enables access and control of any one or more of the physical and logical servers by users. The server cloud manager receives user credential information via the user interface and provides control and access of one or more of the physical and logical servers employing the user database.

Each logical server may incorporate a KVM resource. The virtualization software of each physical server may implement a virtual KVM function to enable access to each KVM resource of each logical server linked to that physical server. The SCM provides KVM redirection between a user KVM client and the virtual KVM function of each physical server. In one configuration, the server cloud manager provides KVM mapping information to the user KVM client to enable direct access to a selected logical server by the user KVM client. Alternatively, the server cloud manager includes a KVM service and a KVM client. The KVM service interfaces a user KVM client and the manager KVM client maps KVM functions between the KVM service and the virtual KVM function.

Examples of persistent attributes include a media access control (MAC) address, a boot disk image, a system identifier, a processor type and access credentials. The persistent attributes may further include semi-persistent attributes including an internet protocol (IP) address, a logical name, a server cloud manager identifier, user account information, a non-boot disk image and network connections. Examples of non-persistent attributes include processor resource information, memory resource information, KVM resources and disk redundancy level.

A shared storage system may be provided and coupled to the network system. The shared storage system may store one or more logical server templates that are each configured to enable replication of a logical server on a physical server.

Each physical server may include at least one physical server agent that is controlled by the server cloud manager in order to manage physical resources for each logical server linked to a physical server. In one embodiment, the physical server agent runs as a service on an operating system of the physical server. Each physical server agent is capable of controlling physical server functions and associated physical resources via interfaces to virtualization software of the physical server. Each logical server may include a logical server agent that extends control of a corresponding logical server to the server cloud manager. The logical server agent may run as a service on an operating system of the corresponding logical server, where each logical server may execute a separate operating system. The server cloud manager interfaces and controls each physical server agent and each logical server agent.

At least one advantage of a virtualized logical server cloud according to an embodiment of the present invention is that each logical server may be non-deterministically linked to a physical server over time. For example, the server cloud manager may orchestrate a move procedure to move a logical server from a first physical server to a second physical server. The move procedure includes copying a disk image from the first physical server to the second physical server, copying logical server configuration from the first physical server to the second physical server, and remapping KVM functions from the first physical server to the second physical server. The move procedure may further include remapping network requests for the moved logical server from the first physical server to the second physical server. The original logical server may be suspended, deactivated, deleted or otherwise placed in standby mode.

The server cloud manager may instruct a physical server agent to replicate a logical server on the underlying physical server. Replication involves activation of a new logical server in a server cloud. After the replicated logical server is activated, the server cloud manager redirects a KVM client to the virtual KVM function. The physical server agent, as controlled by the server cloud manager during a replication procedure, retrieves and locally stores a logical server template, creates logical server configuration information from the logical server template, activates a logical server from the logical server configuration information, and relays instructions from the server cloud manager to a logical server agent of the activated logical server. The logical server agent completes activation of the logical server via commands from the server cloud manager.

The server cloud manager may operate at a maximum security level with administrative rights over logical server administrative access and multiple physical server administrative access to enable logical server instancing. Logical server instancing includes, for example, moving a logical server from a first physical server to a second physical server.

A server cloud management system according to an embodiment of the present invention virtualizes a plurality of logical servers of a bank of physical servers into a logical server cloud. The system includes virtualization software, an attribute database, a user database, a user interface and a server cloud manager. The virtualization software is executed on at least one physical server and enables linkage of logical servers with the physical server. The attribute database maintains status and instance information for each of the plurality of logical servers including persistent and non-persistent attributes of each logical server. The user database includes mapping information between users, the plurality of logical servers and the physical servers. The user interface establishes a portal for users and receives user credential information. The server cloud manager provides access and control of a logical server by a user session from which valid user credential information is received.

A method of virtualizing a plurality of logical servers into a logical server cloud linked to a plurality of physical servers according to an embodiment of the present invention includes providing a virtual KVM function on each physical server for mapping KVM information to logical servers linked to the physical server, maintaining attributes of each logical server by a server cloud manager interfaced to the plurality of physical servers, the attributes establishing an identity of and defining resources for each logical server, mapping, by the server cloud manager, each logical server with a physical server and user information, forwarding, by the server cloud manager, KVM information between remote clients and the virtual KVM functions of each physical server, and managing, by the server cloud manager via a physical server agent, physical resources of a physical server on behalf of each logical server linked to that physical server.

BRIEF DESCRIPTION OF THE DRAWINGS

A better understanding of the present invention can be obtained when the following detailed description of embodiments of the invention is considered in conjunction with the following drawings, in which.

DETAILED DESCRIPTION OF EMBODIMENT(S) OF THE INVENTION

Figure 1:
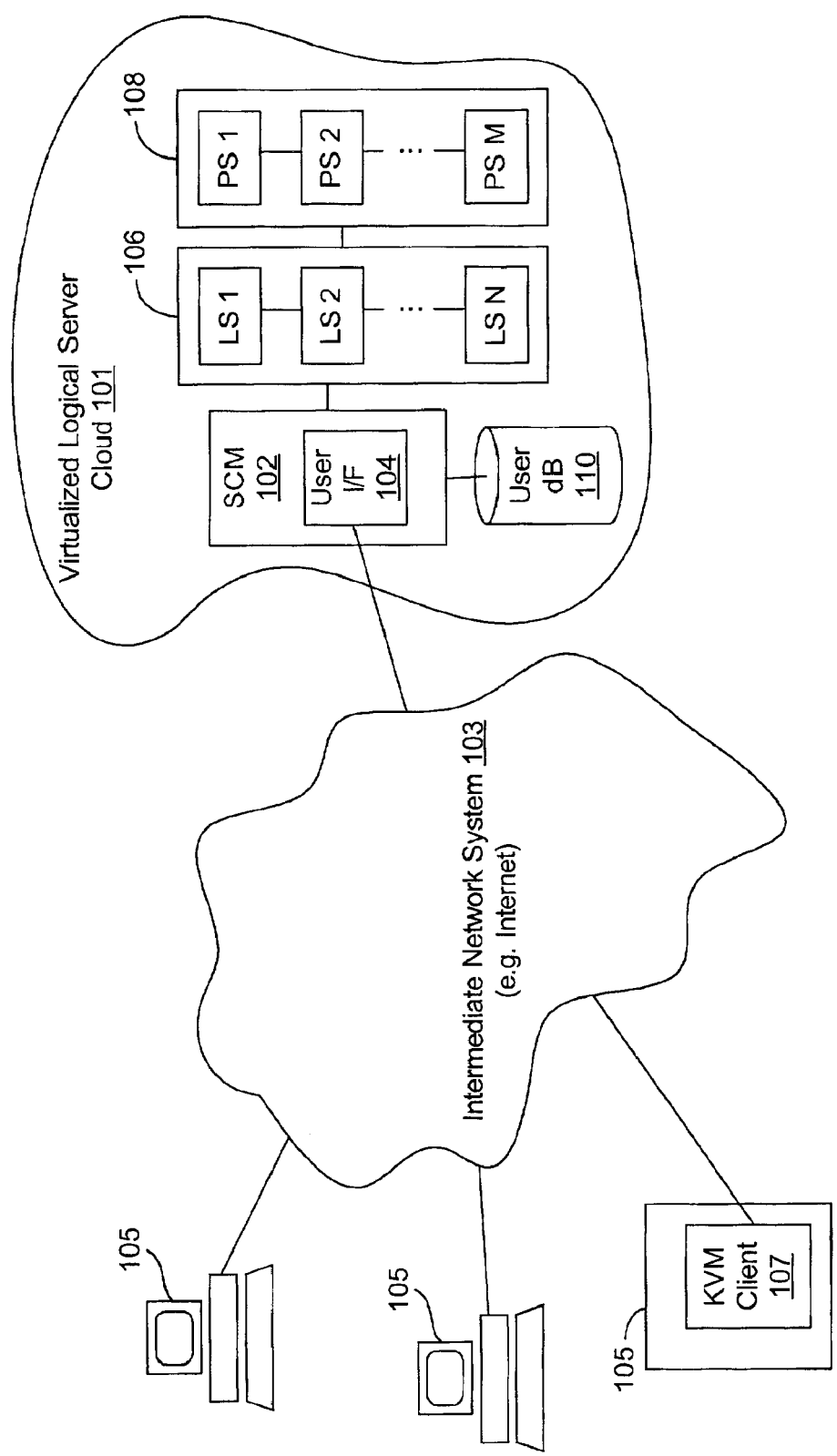
FIG. 1 is an overview block diagram illustrating a virtualized logical server cloud implemented according to an embodiment of the present invention including a server cloud manager (SCM).

The following definitions are provided for this disclosure with the intent of providing a common lexicon. A "physical" device is a material resource such as a server, network switch, or disk drive. Even though physical devices are discrete resources, they are not inherently unique. For example, random access memory (RAM) devices and a central processing unit (CPU) in a physical server may be interchangeable between like physical devices. Also, network switches may be easily exchanged with minimal impact. A "logical" device is a representation of a physical device to make it unique and distinct from other physical devices. For example, every network interface has a unique media access control (MAC) address. A MAC address is the logical unique identifier of a physical network interface card (NIC). A "traditional" device is a combined logical and physical device in which the logical device provides the entire identity of a physical device. For example, a physical NIC has its MAC address permanently affixed so the physical device is inextricably tied to the logical device.

A "virtualized" device breaks the traditional interdependence between physical and logical devices. Virtualization allows logical devices to exist as an abstraction without being directly tied to a specific physical device. Simple virtualization can be achieved using logical names instead of physical identifiers. For example, using an Internet URL instead of a server's MAC address for network identification effectively virtualizes the target server. Complex virtualization separates physical device dependencies from the logical device. For example, a virtualized NIC could have an assigned MAC address that exists independently of the physical resources managing the NIC network traffic.

A "cloud" is a collection of logical devices. The essential element of a cloud is that all logical devices in the cloud may be accessed without any knowledge or with limited knowledge of the underlying physical devices within the cloud. Fundamentally, a cloud has persistent logical resources, but is non-deterministic in its use of physical resources. For example, the Internet may be viewed as a cloud because two computers using logical names can reliably communicate even though the physical network is constantly changing. A "virtualized logical server cloud" as described herein refers to a logical server cloud comprising multiple logical servers, where each logical server is linked to one of a bank of physical servers. The boundary of the logical server cloud is defined by the physical resources controlled by a "cloud management infrastructure" or a "server cloud manager" or SCM. The server cloud manager has the authority to allocate physical resources to maintain the logical server cloud; consequently, the logical server cloud does not exceed the scope of physical resources under management control. Specifically, the physical servers controlled by the SCM determine a logical server cloud's boundary. "Agents" are resource managers that act under the direction of the SCM. An agent's authority is limited in scope and it is typically task-specific. For example, a physical server agent (PSA) is defined to have the authority to allocate resources to logical servers, but does not have the authority or capability to create administrative accounts on a logical server. An agent generally works to service requests from the server cloud manager and does not instigate actions on other agents.

FIG. 1 is an overview block diagram illustrating a virtualized logical server cloud 101 implemented according to an embodiment of the present invention including a server cloud manager 102. The virtualized logical server cloud 101 is accessible to one or more remote terminals 105 via an intermediate network system 103, such as the globally-accessible Internet, although any type of network is contemplated. The virtualized logical server cloud 101 includes one or more logical servers 106, individually labeled LS 1, LS 2, ..., LS N, where "N" is a positive integer representing a total number of logical servers. The virtualized logical server cloud 101 further includes a bank of physical servers 108, each physical server individually labeled PS 1, PS 2, ..., PS M, where "M" is a positive integer representing a total number of physical servers, and where M does not necessarily equal N and may be a smaller number. As described further below, the bank of physical servers 108 establishes the physical resources underlying the logical servers 106. In particular, each logical server 106 is linked to and implemented on a corresponding one of the physical servers 108. The virtualized logical server cloud 101 includes the SCM 102 that interfaces and controls each of the logical servers 106 and the bank of physical servers 108. In the embodiment shown, the SCM 102 includes a user interface (I/F) 104 that provides a web page portal or other access mechanism to facilitate communication with the remote terminals 105 via the network system 103. Each terminal 105 may be located anywhere with access to the network system 103, and may be configured with various levels of capability, including simple terminals, thin client computers, low end PCs, etc. In this manner, a user of any remote terminal 105 may login to and access any of the logical servers 106 of the virtualized logical server cloud 101 via the user interface 104 and SCM 102 as though logging into a server directly or via a local area network (LAN).

In one embodiment, a terminal 105 executes a keyboard/video/mouse (KVM) client 107 that transmits keyboard and mouse commands to a selected logical server 106 and that receives video and audio information from the selected logical server 106. The SCM 102 provides KVM redirection either by providing a KVM interface or by mapping the KVM client 107 to allow direct KVM access to the selected logical server 106. In any event, virtually all significant processing occurs at the logical server 106 rather than the terminal 105, although the terminal 105 may retain substantial control of operation of the logical server 106 via the KVM client 107. Also, the remote terminals 105 may include a standard (or non-standard) browser, such as Netscape Navigator or Microsoft Explorer or the like, that facilitates remote access. For example, a user employs the local browser to access a web page associated with or implemented by the user interface 104, where the web page enables the user to input user credential information (e.g., username & password). The graphical user interface (GUI) of the user interface 104 provides the mechanism (portal or other interface) through which the user may access one or more logical servers 106 based on permission. In one embodiment, the user interface 104 displays a stack of logical server graphics, each representing a corresponding one of the logical servers 106 that the user has permission to access. The user then interfaces the logical server graphics (e.g. point and click) to login to or otherwise control a selected logical server. It is noted that the user interface 104 web page may provide an input to receive logical server information so that the user may directly access a selected logical server if desired. The user interface 104 also provides interfaces to provide SCM control of the physical server to enable other functions including copy, move, start, shutdown, reset and any other functions enabled by control over the physical server and virtualization software.

The SCM 102 includes or is otherwise associated with a user database 110 that incorporates a mapping of users, the logical servers 106 and the physical servers 108. In particular, the user database 110 incorporates user credentials and the access information for one or more logical servers 106 that the user has permission to access. Further, the user database 110 incorporates the link information that maps each logical server 106 with one of the physical servers 108. In this manner, each user need only supply corresponding user credentials, and the SCM 102 accesses and provides a corresponding list of the logical servers 106 for which the user has permission to access. The user may select a logical server from the list, such as by clicking a graphical icon or the like, and the user may then login to or otherwise control the logical server. Alternatively, the user may additionally supply information identifying a selected logical server, and the SCM 102 provides access.

It is appreciated that the user dB 110 maintains the mapping to the physical servers 108 and automatically accesses the appropriate physical server corresponding to the selected logical server. In this manner, the user does not have to supply physical server information and, in fact, does not even need to be aware of any specific physical server access or location information. Further, a logical server 106 may be transparently moved from one physical server 108 to another without knowledge of or participation by the user. As long as the user's logical server maintains all of the attributes designated or desired by the user, the user need not be concerned with the identity or location information of underlying specific physical resources enabling operation of the logical servers 106.

Figure 2:
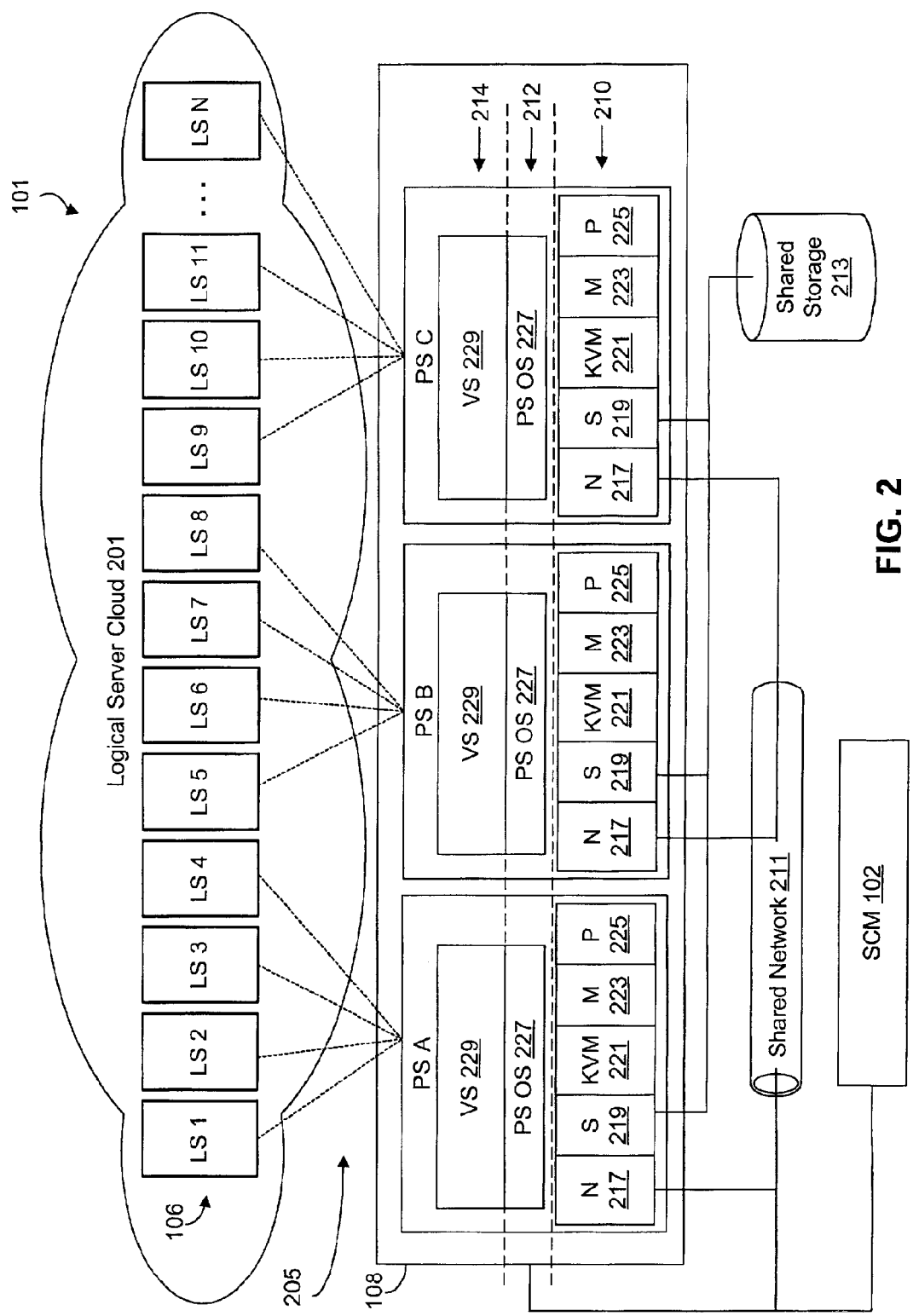
FIG. 2 is a block diagram of the virtualized logical server cloud of FIG. 1 illustrating relationships between the logical servers of a logical server cloud, physical servers, a shared network and the SCM.

FIG. 2 is a block diagram of an exemplary embodiment of the virtualized logical server cloud 101 illustrating relationships between the logical servers 106 forming a logical server cloud 201, the bank of physical servers 108, a shared network 211 and the SCM 102. The bank of physical servers 108 includes several individual physical servers individually labeled PS A, PS B, PS C, etc. Each of the logical servers 106 is non-deterministically linked to a corresponding physical server 108 as illustrated by a corresponding links 205 (illustrated by dashed lines). As shown, the logical servers LS 1–4 are linked to the PS A, the logical servers LS 5–8 are linked to the PS B, and the logical servers LS 9-N are linked to the PS C. It is appreciated that any desired number of physical servers 108 may be included, and that each physical server may be linked to any suitable number of logical servers 106.

It is noted that each logical server 106 is "deterministically" linked to a specific physical server 108 at any given time, but that such linkage or association is "non-deterministic" over time since the logical server may be moved to another physical server. As described further below, each logical server 106 may be moved to any other "compatible" physical server 108 of choice without destroying the identity of the moved logical server 106 as determined by its "persistent attributes". A compatible physical server is one that provides the physical and logical resources needed to retain the persistent attributes of the logical server 106 being moved. As will be described further below, these resources include physical resources such as CPU type, storage capacity, disk configuration, and network connectivity. The resources also include logical resources such as administrative control, cloud manager (SCM identity), software licenses, processor capacity, and commercial/contractual restrictions. An example of a software license as a logical constraint is a physical, CPU-based database license. Software licenses are sometimes tied to physical servers rather than logical servers, so that a logical server may "inherit" licenses of the underlying physical server. Under this license model, the logical server may be moved to another physical server if the new physical server is licensed. Many software licenses follow this model including most virtualization software. Nonetheless, software licenses may also be constructed to follow logical servers since they may be tied to specific licensed users.

Each physical server 108 includes a hardware layer 210, an operating system (OS) layer 212 and a software layer 214. The hardware layer 210 forms a portion of physical resources coupled to or otherwise interfaced with each physical server. The hardware layer 210 includes a network resource "N" 217, a storage resource "S" 219, a KVM resource 221, a memory resource "M" 223 and a processor resource "P" 225. The term "resource" as used in this context is intended to include one or more resources, such as, for example, one or more NIC cards, one or more hard disk drives, multiple input/output (I/O) resources, one or more memory devices, one or more microprocessors, etc. The network resource 217 couples or otherwise interfaces each physical server with the shared network 211, so that the physical servers 108 may communicate with each other and to the SCM 102. The network resource 217 may include, for example, one or more NICs or the like that enable communications between each physical server and the network 211. The shared network 211 may be implemented as a single network fabric or may be segmented into multiple network fabrics. Multiple network fabrics are desired to ensure scalability and security. The network 211 provides a communication link (not shown) to the intermediate network system 103. For example, the network 211 may include a firewall or the like associated with a particular network fabric, which provides an interface to the network system 103.

Each physical server 108 includes a storage resource 219 that may include one or more local disk drives, such as magnetic hard disk drives or the like, for static or permanent storage of software, programs, data, etc. The term "storage" as used herein also incorporates other media types including removable media such as CD-ROM, Zip disks, floppy disks, or the like. The storage resource 219 may also include communication links to one or more shared storage resources 213 either separately or via the shared network 211. The storage resources 213, 219 may each comprise a single device (e.g. System Area Network (SAN)) or may be divided into multiple physical and logical devices (e.g., File Transfer Protocol (FTP) and Network Attached Storage (NAS) or the like). The storage resources 213, 219 may be implemented as a Redundant Array of Independent (or Inexpensive) Disks (RAID) or the like with redundant information to ensure data integrity. The storage resource 219 is preferably configured to use multiple devices to ensure scalability. It is noted that network and storage resources may be shared between the physical servers 108 using an Ethernet or Fiber switching fabric. Access to the network and storage resources is preferably logical rather than physical so that they act like resource clouds.

Each physical server 108 also includes a keyboard, video and mouse (KVM) resource 221 for interfacing corresponding general input/output (I/O) devices, such as a keyboard, a video monitor, speakers and a mouse. The KVM resource 221 includes, for example, keyboard, video, speaker and mouse interface hardware and software drivers for coupling to each physical server 108. Each physical server 108 includes a memory resource 223, such as any combination of read-only memory (ROM) and random access memory (RAM) devices or the like. Each physical server 108 includes a processor resource 225, such as a central processing unit (CPU) including one or more microprocessors or the like.

Each physical server 108 includes an operating system (OS) 227 within its OS layer 212, such as any suitable standard OS offered by Microsoft, including Microsoft Windows 98, 2000, etc. or Microsoft NT, or other suitable operating systems such as those based on UNIX or Linux. The present invention is not limited to any type of OS employed by the physical servers 108 and each physical server may executed a different OS independent of the other physical servers. Each physical server 108 executes virtualization software 229, within its software layer 214, where the virtualization software 229 manages physical resources of the logical servers 106 linked thereto. The virtualization software 229 facilitates eliminating dependency between physical hardware and the logical configuration of the logical servers 106. Virtualization software enables separation of logical from physical resources. Such separation may be achieved by controlled partitioning of the operating system or the physical resources or by emulation of the operating system or emulation of hardware. In one embodiment, the virtualization software 229 is merged with or otherwise incorporates the OS 227. A separate logical server interface may be provided to interface virtualization software that is merged with the OS.

The SCM 102 is shown as a separate entity interfaced to the shared network 211 and the physical servers 108. The SCM 102, however, may be implemented in any one of several different manners. In one embodiment, the SCM 102 is implemented on a separate physical server or administrator computer, similar to the physical servers 108, which is coupled via the network 211 and the shared storage resource 213 in similar manner as the physical servers 108. In an alternative embodiment, the SCM 102 is a separate logical server, similar to the logical servers 106, that is deterministically or non-deterministically linked to any of the physical servers 108. The SCM 102 may alternatively be implemented as a separate application executing on any one of the logical servers 106. In yet another embodiment, the SCM 102 is a distributed function comprising a peer to peer application or the like. In any of these configurations, the SCM 102 includes SCM software to manage the logical servers 106 and the physical servers 108.

Figure 3:
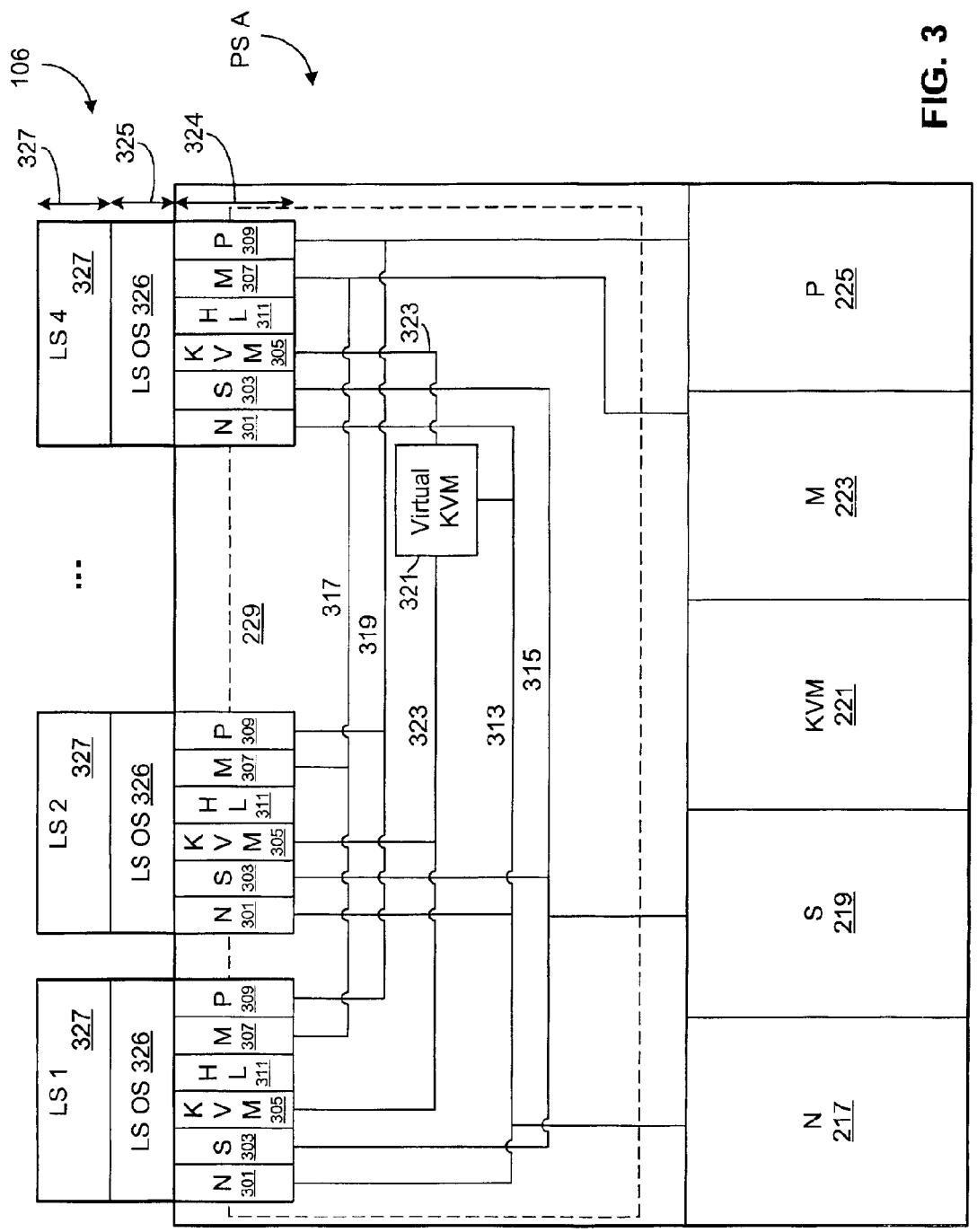
FIG. 3 is a block diagram of an exemplary embodiment of a physical server linked to one or more logical servers using virtualization software.

FIG. 3 is a block diagram of an exemplary embodiment of a physical server 108, such as the PS A, linked to one or more logical servers 106, such as the logical servers LS 1–4. Although the physical server PS A includes the hardware, OS and software layers previously described, only the virtualization software 229 is shown for clarity. Each logical server 106 also includes a "hardware" layer 324, an OS layer 325 for executing an LS operating system 326 and a software layer 327 for executing desired software applications. Each LS OS 326 may be any desired OS as previously described, such as those from Microsoft or based on UNIX, Linux, etc. Also, each LS OS 326 is executed independently from every other LS OS 326, or otherwise gives every appearance of independent operation from the user's perspective. In the hardware layer 324, the logical server 106 includes a network resource 301, a storage resource 303, a KVM resource 305, a memory resource 307 and a processor resource 309 in a similar manner as the hardware layer 210 of the physical server 108, and where the term "resource" is used in a similar context. Each logical server 106 also includes a host link "HL" 311 to a corresponding physical server 108 to enable communication between the logical and physical servers.

The hardware layer 324 of each of the logical servers 106, however, does not necessarily include actual hardware but instead provides virtualized resources corresponding to the physical resources of or otherwise coupled to the underlying physical server. As illustrated by links 313, the network resource 301 of every logical server 106 is virtualized to the corresponding network resource 217 of the underlying physical server. It is noted that the network resource 301 of each logical server 106 is independently virtualized to the network resource 217 to retain virtual independence among the logical servers 106. In a similar manner, links 315 illustrate that the storage resource 303 of every logical server 106 is virtualized to the corresponding storage resource 219 of the underlying physical server. Also, links 317 illustrate that the memory resource 307 of each logical server 106 is virtualized to the corresponding memory resource 223 of the underlying physical server. As illustrated by links 319, the processor resource 309 of every logical server 106 is virtualized to the corresponding processor resource 225 of the underlying physical server. Depending on the physical resources available, virtualized resources may or may not be shared. For example, a physical server 108 with multiple NICs may be configured to dedicate one NIC to a specific logical server while the remaining logical servers share remaining NICs.

The virtualization software 229 implements a virtual KVM 321 that virtualizes each KVM resource 305 of each logical server 106 as illustrated by links 323. The virtual KVM 321 interfaces the network resource 217 of the underlying physical server as illustrated by links 313. The SCM 102 maintains KVM mapping for each logical server 106. The SCM 102 provides KVM redirection by incorporating a KVM service and client that are interfaced to the KVM resource 305 of each logical server 106 via the network 211 and a corresponding virtual KVM 321, or otherwise by mapping KVM requests to allow direct KVM access to the logical servers 106. The virtualization software 229 and the PS OS 227 implement the illustrated links 313, 315, 317, 319 and 323.

Figure 4:
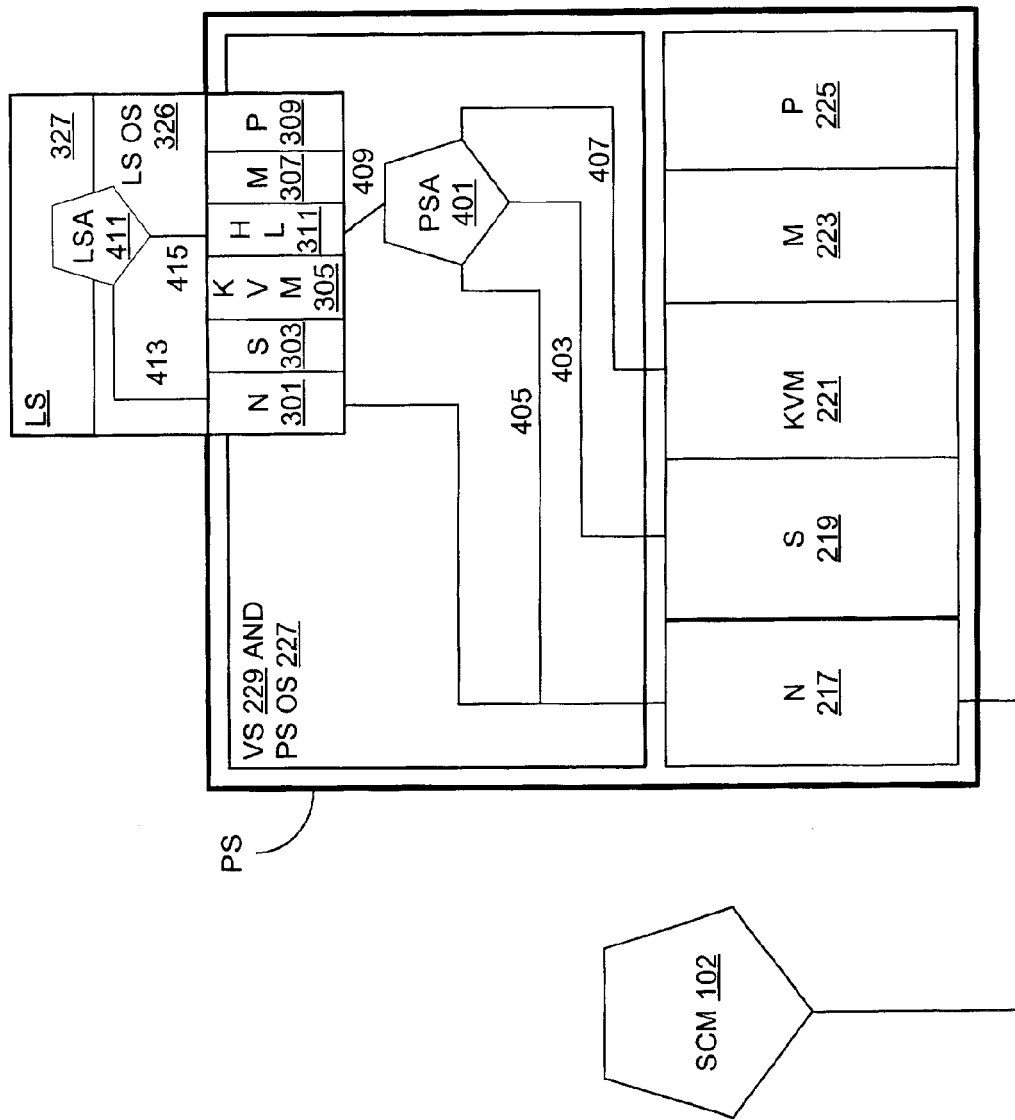
FIG. 4 is a block diagram of an exemplary embodiment of a physical server linked to a logical server including logical and physical server agents that facilitate management by the server cloud manager of FIG. 1.

FIG. 4 is a block diagram of an exemplary embodiment of a physical server PS linked to a logical server LS including logical and physical server agents that facilitate management by the SCM 102. The virtualization software 229 and the PS OS 227 are shown merged for simplicity of illustration. The physical server PS includes a physical server agent (PSA) 401 that, in the embodiment shown, runs as a service on the PS OS 227 so that it can receive instructions from the SCM 102 or be manually controlled by an administrator. The PSA 401 is capable of controlling all of the functions of the physical server PS through interfaces to an application program interface (API) of the virtualization software 229 (VS API) and interfaces to the PS OS 227. The PSA 401 includes an interface 403 to the storage resource 219 and an interface 405 to the network resource 217 of the physical server PS and the network resource 301 of the logical server LS. The interfaces 403, 405 allow management of the resources of the physical server PS, such as local storage devices or the like, and also enable access to network resources like online storage. The PSA 401 also includes an interface 407 to the KVM resource 221 of the physical server PS and an interface 409 to the host link 311 of the logical server LS linked to the physical server PS.

The exemplary logical server LS includes a logical server agent (LSA) 411 that runs on the corresponding LS operating system 326 and that extends control of the logical server to the SCM 102. The LSA 411 communicates to the network resource 301 via an interface 413 and communicates to the host link 311 via an interface 415. The LSA 411 assists with the SCM 102 functionality of replicating and copying by creating a system identifier (SID), as described further below, and by doing other administrative functions of the logical server LS such as creating user accounts, installing software, and controlling OS settings. The LSA 411 is positioned so that it can receive administrative and security instructions from the SCM 102. The LSA 411 also processes requests from the SCM 102 relayed by the PSA 401 via the host link 311, which enables the LSA 411 to operate without a direct link to the SCM 102. Since the LSA 411 runs on the LS OS 326, it may use standard network calls to communicate with the SCM 102 if desired.

The SCM 102 manages all of the LSAs 411 and PSAs 401 in the virtualized logical server cloud 101. The SCM 102 maintains the status and instance information for each logical server 106 and issues instructions to each physical server 108 via corresponding PSAs 401. For example, the SCM 102 may instruct the PSA 401 to shutdown a linked logical server 106 using the VS API and then copy the LS disk image to another physical server 108. The SCM 102 may then instruct the PSA 401 on the target physical server 108 to activate a new logical server 106 with the copied LS disk image. The SCM 102 may then coordinate the target PSA 401 and LSA 411 to give the new logical server a unique identity.

The SCM 102 maintains the attributes of all of the logical servers 106 of the logical server cloud 201. Each logical server 106 has combined attributes that contain the identity of the logical server 106, and that define the capabilities and associations of the logical server 106 in the virtualized logical server cloud 101. The combined attributes are organized into persistent, semi-persistent and non-persistent attributes, each category further subdivided into logical and physical attributes. The "persistent attributes" are those attributes that are retained to preserve the identity of a logical server 106 regardless the underlying physical server 108. The physical persistent attributes include media access control (MAC) addresses, boot disk images and CPU type. The logical persistent attributes include system identifiers (SID), cluster identifiers (CIDs), and administrator passwords. Some persistent attributes are "semi-persistent" in that they are expected to remain unchanged, at least for a period of time, but that are not essential to the identity of the logical server 106. Semi-persistent attributes have weaker requirements than persistent attributes because they can be more easily changed without impacting logical server identity. Changes to semi-persistent attributes may require some reconfiguration of the logical server 106, but will not change its fundamental identity or core functions such as boot processes or MAC addresses. Examples of physical semi-persistent attributes include non-boot disk(s) images and network connections. Examples of logical semi-persistent attributes include internet protocol (IP) addresses, logical names, cloud manager reference (identification of the SCM), and user accounts.

Non-persistent attributes are those that may be required to link the logical server 106 to a physical server 108 and to enable it to function, but that are not essential to the identity of the logical server 106. Non-persistent attributes include dynamic identity attributes that may be easily created and destroyed throughout the life of the logical server 106. Examples of physical non-persistent attributes include memory (RAM) resources, CPU cycles, KVM resources, disk redundancy level, access to removable media, etc. CPU cycles or resources refer to the percentage of CPU time allocated to a particular logical server 106. Each logical server may include a guaranteed minimum, such as, for example, ten percent of total CPU cycles, although the SCM 102 may redistribute processor resources based on demand and usage. Memory resources generally refers to the amount of memory available to a logical server, and may include a guaranteed minimum based on demand. Disk redundancy level refers to whether the storage resources include redundant information, such as provided with RAID configurations. Examples of logical non-persistent attributes include cookies, browser, encryption keys (temporary), etc. A user may desire to upgrade from non-redundant storage to redundant storage to improve data integrity and substantially reduce risk of data loss.

The SCM 102 manages the physical attributes (persistent, semi-persistent and non-persistent) of the logical server LS via the PSA 401 and manages the logical attributes (persistent, semi-persistent and non-persistent) of the logical server LS via the LSA 411. The LSA 411 is optional, although if the LSA 411 is not present, the SCM 102 may not be able to modify the logical attributes of a logical server LS. The SCM 102 contains and always maintains the persistent attributes of each logical server 106 even when a logical server is moved to a different physical server 108 or otherwise stored indefinitely in an inactive state. Such storage of inactive logical servers may be on the shared storage resources 213. Maintaining the persistent attributes of each of the logical servers 106 ensures that changes in physical hardware are transparent to the users of the logical servers 106. Even though changes to physical hardware are transparent, many non-persistent attributes are closely tied to the physical hardware. For example, a logical server 106 can be moved to a different physical server with more (or less) RAM and a faster (or slower) CPU of the same or different type. When the logical server 106 is instantiated on a new physical server 108, the non-persistent attributes of the logical server 106 may be altered to reflect more memory and additional CPU resources. Since only non-persistent attributes are altered and the persistent attributes remain unchanged, the identity of the logical server 106 is maintained.

Figure 5A:
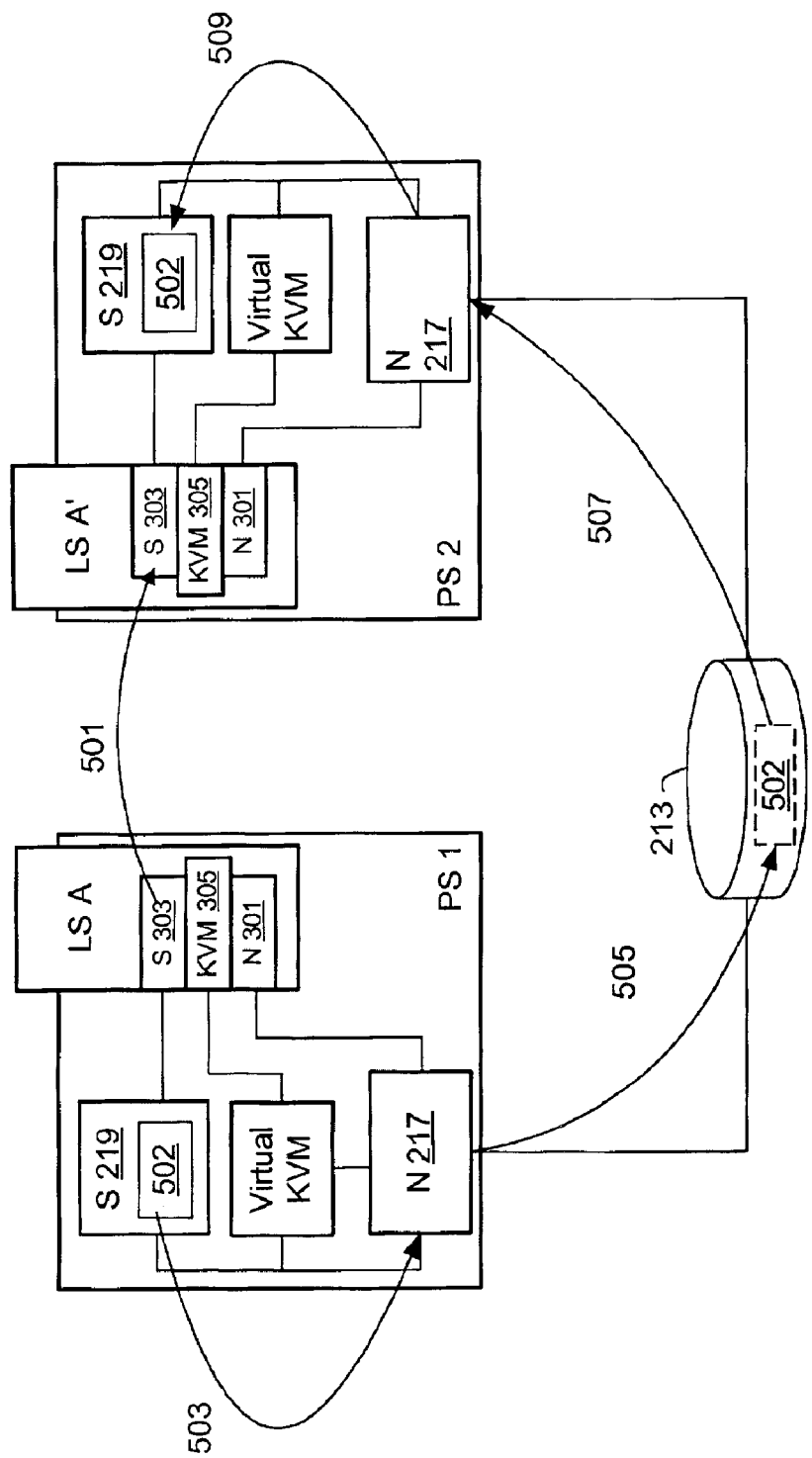
FIGS. 5A, 5B and 5C are block diagrams illustrating respective steps of a move procedure for moving a logical server from one physical server to another.
Figure 5B:
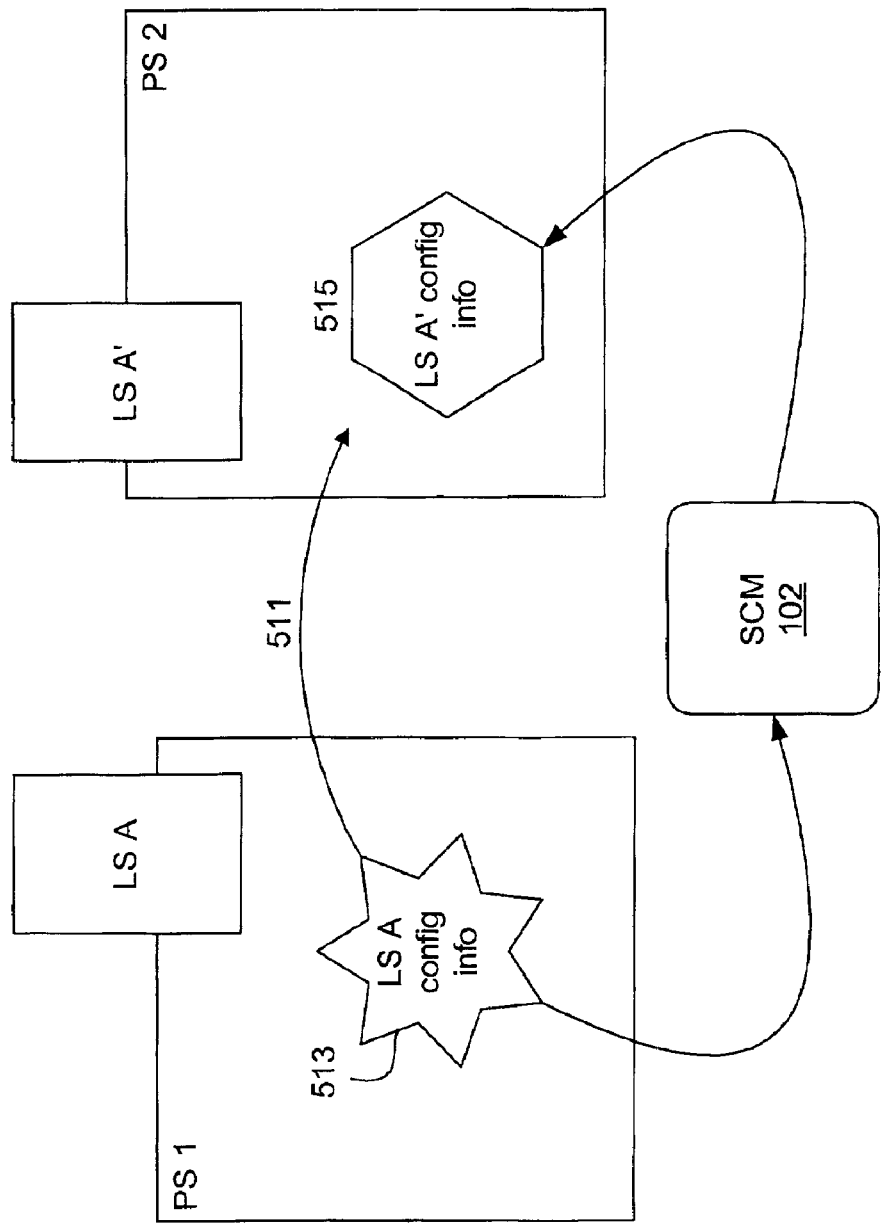
Figure 5C:
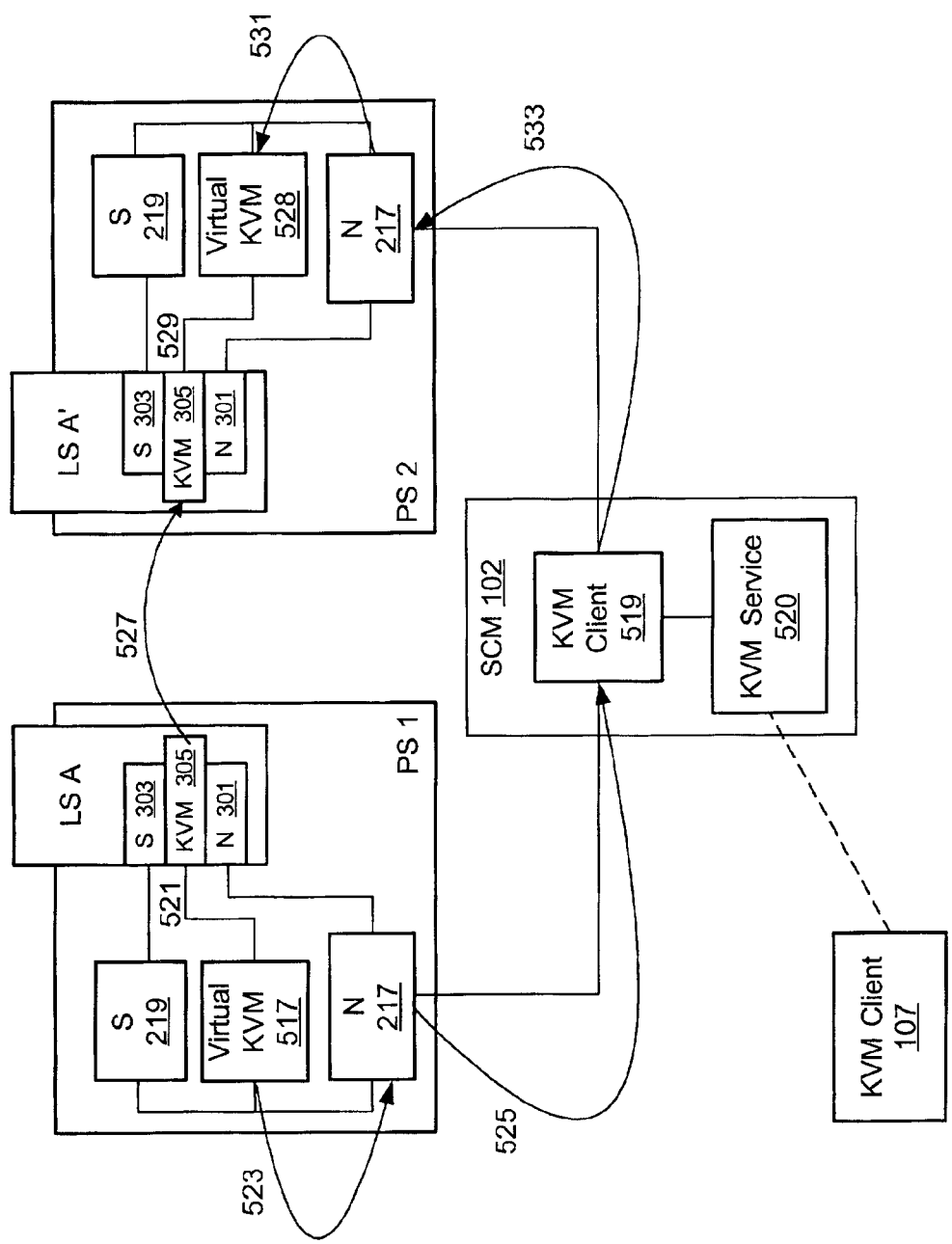

FIGS. 5A, 5B and 5C are block diagrams illustrating respective steps of a move procedure for moving a logical server from one physical server to another. Moving a logical server to a different physical server involves a combination of moving and reconfiguring the persistent attributes of the logical server to the target physical server. Virtualization allows the move to be completely transparent to the user of the logical server. The move procedure involves moving a virtualized disk image of the logical server to the target physical server creating a logical server configuration on the target physical server, redirecting KVM requests to the target physical server, and redirecting network requests for the logical server to the target physical server. The PSAs of the original and target physical servers manage the changes at the direction of the SCM 102. Physical attributes, including disk configuration, CPU cycles, etc., and non-persistent attributes, e.g. memory size, may also be transparently changed to allow for little or no impact during upgrades or downgrades.

FIG. 5A illustrates moving a virtualized hard disk or disk image 502 as the first step in moving a logical server, shown as LS A, from an original physical server, shown as PS 1, to a substantially identical logical server, shown as LS A', on a target physical server, shown as PS 2, as indicated by arrow 501. In a first step illustrated by arrows 503 and 505, the disk image 502 located on the storage resource 219 of PS 1 is transferred to the shared storage resource 213 via the network resource 217 of PS 1. The disk image 502 of LS A generally incorporates the boot disk image and non-boot disk image(s) and may collectively be handled in the same manner as a normal file transfer. In one embodiment, the disk images of a logical server are stored as files and managed by the virtualization software 229 on the physical server. Alternatively, the disk image may be stored as data within an appropriate database structure. In a next step illustrated by arrows 507 and 509, the disk image 502 is transferred from the shared storage resource 213 to the storage resource 219 of PS 2 via the network resource 217 of PS 2.

The LS disk images (boot and non-boot) preferably reside within the storage resource 219 of the underlying physical server for maximum performance. The shared storage resource 213 is primarily used for other purposes, such as backup storage of LS configurations, LS transfers between physical servers, storage of generic or template LS configurations (described further below), etc. It is noted, however, that the LS disk images may also reside, in part or in whole, on the shared storage resource 213. Thus, if the disk image 502 of LS A initially exists on the shared storage resource 213, it may be directly transferred to the storage resource 219 of PS 2. Also, the disk image for LS A' on PS 2 may be configured to exist on the shared storage resource 213, in which case the disk image 502 is directly transferred to space on the shared storage resource 213 allocated for LS A'. Furthermore, the entire transfer may occur within the shared storage resource 213 by transferring from space allocated for LS A to space allocated for LS A'. Additionally, the shared storage resource 213 may be bypassed altogether in which case the transfer of the disk image 502 occurs directly between the physical servers PS 1 and PS 2 via the shared network 211. In any event, the disk image 502 for LS A is now moved to a location for LS A' coupled to the physical server PS 2.

FIG. 5B illustrates creating LS configuration information on PS 2 for LS A' as indicated by arrow 511. The LS A configuration information for LS A, shown at 513, defines how the relevant LS A attributes are described on PS 1 to the virtualization software 229. The physical attributes are determined in the LS configuration information 513 for PS 1. In one embodiment, the LS A configuration information 513 may be stored as a file on PS 1. Alternatively, the LS A configuration information 513 is maintained in a database by the virtualization software 229. In either case, the SCM 102 tracks LS configuration information in a local database. For any of these configurations, the move procedure includes moving or recreating the LS A configuration information 513 on PS 1 to LS A' configuration information 515 on PS 2. The SCM 102 database tracking the LS A configuration information 513 is reconfigured, such as modifying links or references, to track the new LS A' configuration information 515 on PS 2.

In one configuration, it is noted that the LS A configuration information 513 was originally generated by the PSA 401 of PS 1 when LS A was created on PS 1. In this case, the PSA 401 of PS 2 is employed to generate new configuration information for LS A' on the target physical server PS 2. The LS A' configuration information 515, after being created on PS 2, may be altered as appropriate to change the non-persistent attributes of LS A' to reflect linkage and association with PS 2 rather than PS 1. The LS A' configuration information 515 may initially be a copy of the LS A configuration information 513. Alternatively, the PSA 401 of PS 2 automatically copies the appropriate persistent attributes from the LS A configuration information 513 and generates new non-persistent attributes for LS A' while being created on PS 2. After the LS A' configuration information 515 is created and modified, if necessary, the SCM 102 (either directly or via the PSA 401 of PS 1) deletes the LS A configuration information 513 on PS 1. Furthermore, the artifacts of the logical server LS A on PS 1 may be deleted.

FIG. 5C illustrates an exemplary embodiment of redirecting KVM resources and requests to the target physical server PS 2 for the logical server LS A'. A virtual KVM 517 exists on PS 1 for LS A, where the virtual KVM 517 handles KVM network requests between the host and a remote client for LS A. As described previously, the virtualization software 229 of each physical server 108 implements virtual KVMs. The remote client may be, for example, the KVM client 107 of a remote terminal 105. In the configuration illustrated, the SCM 102 includes a KVM service 520 that interfaces the remote KVM client 107 and that interfaces another KVM client 519 that is also incorporated within the SCM 102. The KVM client 519 initially incorporates a mapping to the virtual KVM 517. In this manner, KVM requests to and from LS A are handled via the KVM client 519 of the SCM 102 and the virtual KVM 517 of PS 1 as indicated by arrows 521, 523 and 525. In order to move the KVM functions for LS A on PS 1 to LS A' on PS 2 as indicated by arrow 527, the SCM 102 replaces the mapping from PS 1 to PS 2 of the KVM client 519 so that KVM requests and commands between the KVM client 107 and LS A' are handled via the KVM client 519 of the SCM 102 and a virtual KVM 528 of PS 2 as indicated by arrows 529, 531 and 533.

In an alternative embodiment, the SCM 102 provides KVM redirection by providing mapping information to the KVM client 107 to allow direct KVM access to the selected logical server 106. Such mapping is similar to operation of a Domain Name System (DNS) server that maps a URL from a client computer to a corresponding IP address of the corresponding server on the Internet to enable the client computer to have direct access without further intervention by the DNS server. In this case, the SCM 102 is only initially involved to provide the mapping information and does not provide the KVM interface thereafter. Nonetheless, the SCM 102 retains the mapping information. Such KVM redirection by mapping may compromise security. However, performance is enhanced since the SCM 102 no longer presents a potential bottleneck to KVM communications.

Network requests are redirected from PS 1 (for LS A) to PS 2 (for LS A') by the SCM 102. As described previously, the shared network 211 may comprise multiple network fabrics based on particular hardware configurations. Network configuration changes may be required to maintain connectivity with LS A' after the move. The network hardware mappings (e.g., port mappings) are modified as necessary to maintain the logical net configuration.

After the logical server LS A' is completely generated on PS 2 and after KVM and network requests are successfully redirected, LS A' becomes LS A on PS 2 and the original LS A on PS 1 is removed or deleted.

Figure 6:
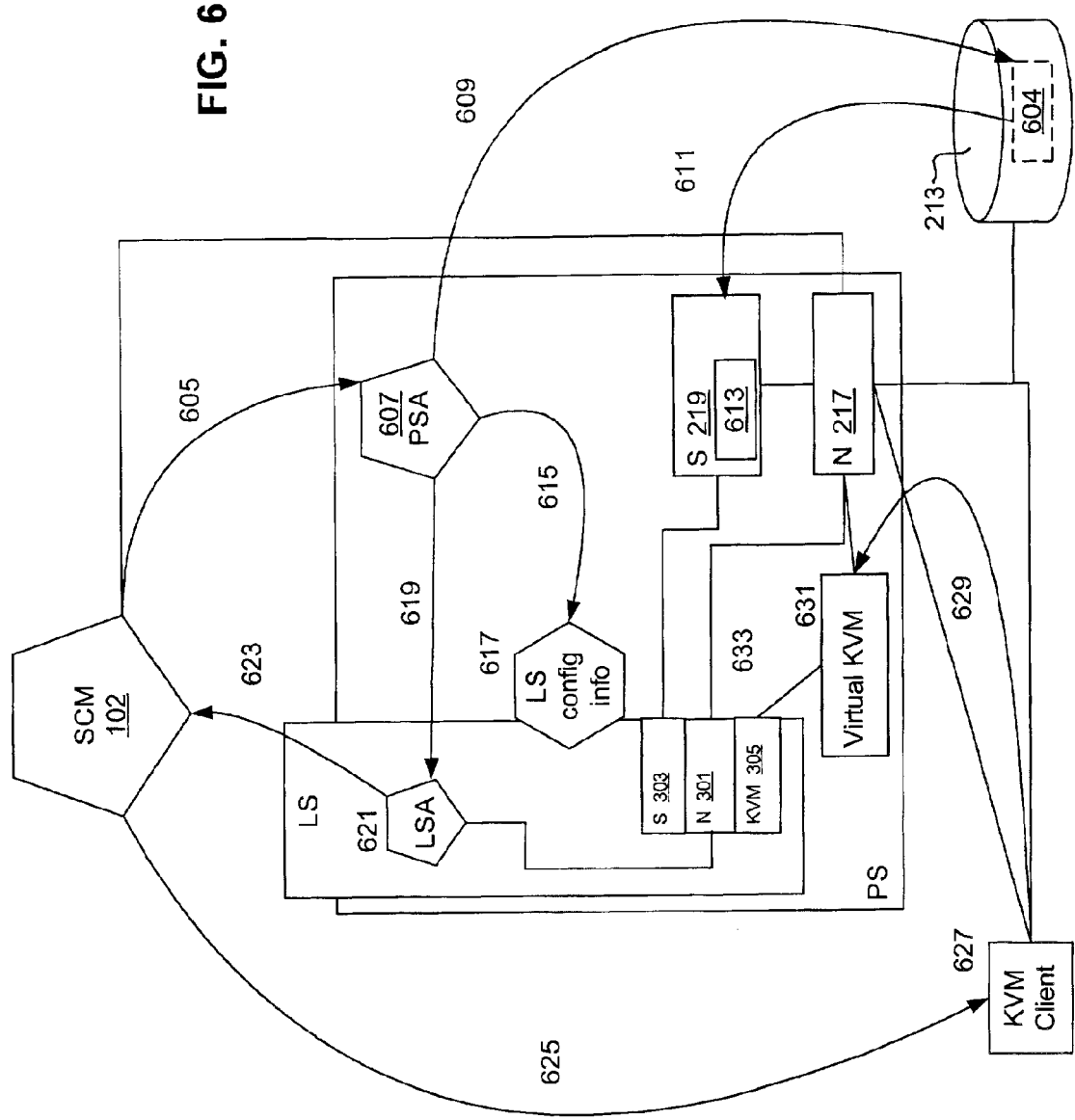
FIG. 6 is a block diagram illustrating a replicating procedure for creating a logical server on a physical server.

FIG. 6 is a block diagram illustrating a replicating procedure for creating a logical server LS on a physical server PS. The SCM 102 instructs a PSA 607 of the physical server PS to generate new configuration information for the logical server LS as shown by arrow 605. The PSA 607 uses information provided by the SCM 102 to request a copy of an LS template 604 from the shared storage resource 213 as shown by arrow 609. The shared storage resource 213 may store a library of LS templates, each having initially defined attributes of model logical servers based on user's needs. The LS template 604 incorporates disk image and configuration information in a similar manner as the LS configuration information 513 previously described. LS templates include LS disk files that have been designed to facilitate changing their persistent attributes. Typically, it is difficult to change the persistent attributes of a logical server that has been activated. More particularly, an LS template is a specially configured logical server and has substantially the same logical and physical manifestations. A primary difference is that the LS template has been specially configured for replication. Many factors may prevent replication of a non-prepared logical server including non-replicatable software configurations, configured user accounts, and dependence on system identifiers like SID or MAC address. An LS template, however, is specifically configured to make it ready to change its persistent attributes once copied to a physical server.

A copy of the LS template 604 from the shared storage resource 213 is forwarded to and stored as LS template 613 on the storage resource 219 of the physical server PS as indicated by arrow 611. In this manner, a copy of the disk image(s) now exist on the target physical server PS, but is not yet part of a unique logical server. The PSA 607 creates new LS configuration information 617 on the target physical server PS based on the LS template 613 as indicated by arrow 615. The LS configuration information 617 includes persistent, semi-persistent and non-persistent attributes in a similar manner as previously described. The PSA 607 then activates the logical server LS on the physical server PS from the LS configuration information 617 and relays instructions from the SCM 102 to an LSA 621 of the logical server LS as indicated by arrow 619. The now-activated LSA 621 then requests configuration specifications directly from the SCM 102 as indicated by arrow 623. KVM mapping of a KVM client 627 is established by the SCM 102 as indicated by arrow 625. KVM requests are directed to the logical server LS via a virtual KVM 631 on the physical server PS and to KVM resources 305 of the logical server LS as indicated by arrows 629 and 633. Also, network requests for the logical server LS are directed by the SCM 102 to the logical server LS in a similar manner as previously described.

It is appreciated that replicating a logical server from a disk image is similar to moving a logical server as previously described, except that replicating involves additional LS configuration work. Specifically, a unique identity must be generated for the replicated logical server including both PSA configuration (e.g. MAC address) and LSA configuration (e.g., Windows SID). The work of creating a unique logical identity is performed by the LSA of the replicated logical server after the PSA of the target physical server creates and starts the replicated logical server.

The severing of the deterministic link between logical and physical servers alters and expands the possible security states for logical server access. The server cloud security model accommodates both logical and physical server access levels and allows for a security level that spans multiple physical servers. In order to cover all possible combinations, 6 security access levels are defined as illustrated by the following Table:

| Level | Security Level | LS Access | PS Access | Control Agent | Functions |
|---|---|---|---|---|---|
| 0 | Awareness | None | None | None | None |
| 1 | Communication | Read | None | Direct | Normal Communication |
| 2 | Status Data | Read | Read | SCM Read | Normal Communication + Heartbeat |
| 3 | Software Control | Admin | Read | LSA (via SCM) | LS Admin (install Software |
| 4 | Hardware Control | Admin | Admin | PSA (via SCM) | LS Activation (reboot, snapshot, console |
| 5 | Cloud Control | Admin | Multi-PS Admin | SCM Admin | LS Instancing (create, move) |

These levels are numbered 0 to 5 with 0 being the most restrictive access level. An SCM operates at the maximum access level 5 (administrator rights on the logical server and multiple physical server administrator rights).

Users of a logical server may gain access to a security level by proxy through the SCM. The SCM is responsible for validating and executing requests. In some cases, users may choose to exercise their access rights directly on a logical server. For example, a user with access level 3 (software control) may choose to add a user account directly to the logical server rather than making the request through the SCM. In other cases, a user may only be able to exercise their access rights through the SCM. For example, a user may not have the direct rights to move a logical server between two physical servers even though that user may have indirect authority via the SCM.

It is now appreciated that virtualization according to the present invention completes the separation between logical and physical servers and enables a logical server to exist independent of a specific physical server. Embodiments of the present invention enable logical servers to exist as logical entities that are decoupled from physical server resources that instantiate the logical server. Decoupling means that the logical attributes of a logical server are non-deterministically allocated to physical resources, thereby effectively creating a cloud of logical servers over one or more physical servers. The present invention describes a new deployment architecture and applies theoretical treatment of servers as logical resources in order to create a logical server cloud. Complete logical separation is facilitated by the addition of the SCM, which is an automated multi-server management layer.

A fundamental aspect to a logical server cloud is that the user does not have to know or provide any physical server information to access one or more logical server(s), since this information is provided within the SCM. This is particularly advantageous if the user has access permission to multiple logical servers spanning multiple physical servers. Each logical server is substantially accessed in the same manner regardless of underlying physical servers. Also, the user experiences no change in access approach even when a logical server is reallocated to a different physical server. Any such reallocation is completely transparent to the user unless such reallocation was directed by the user in the form of an upgrade or downgrade or any other modification requested by the user. In those cases, the user accesses the logical server in the same manner and is presented with the modified logical server in accordance with his or her request.

Logical server management is substantially improved employing a virtualized logical server cloud in accordance with embodiments of the present invention. As described above, the server cloud manager may perform routing by moving a logical server from a first physical server to a second physical server. Replication of a logical server may be from a stored master template or from an existing logical server, regardless of its state. In either case, additional logical servers are created and given unique identities in the logical server cloud.

Each logical server may have multiple states, such as active, standby, hibernation, etc. For example, a logical server moved from the first physical server may either be erased or placed in standby. Also, the logical server cloud may include multiple instances of a logical server in which only one instance is active at a time while the remaining instances are in standby mode. The SCM may perform switching by activating a logical server instance in standby and by switching an active instance to standby mode. The SCM controls such activation and ensures that only one of the logical server instances is active and that the others are in standby mode or otherwise inactive.

A hibernation mode is also contemplated in which a logical server is removed from a physical server and stored, such as in the shared storage resource 213. A logical server in hibernation mode may be recalled and activated at any time.

The ability to move, copy and replicate logical servers and to provide multiple states facilitates cloud balancing in which the SCM takes necessary actions to match resource demands. The SCM may move a logical server instance from one physical server to another with greater capacity, such as, for example, greater CPU resources or a larger amount of memory. Several logical server instances may exist, each with various levels of capabilities and resources. The SCM may activate any one of the logical server instances which has sufficient capabilities and resources to meet demand at any given time and can dynamically switch between instances as demand changes. The SCM may further replicate a logical server as many times as necessary to allocate a greater level of capacity within the logical server cloud to a set of logical servers. Logical servers in hibernation may be retrieved and activated for any of the reasons previously described.

Although a system and method according to the present invention has been described in connection with one or more embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A virtualized logical server cloud, comprising:
   a plurality of logical servers, each having persistent attributes that establish its identity;
   a network system;
   a plurality of physical servers, each coupled to physical resources including a network resource for interfacing the network system, a data storage resource and a processor resource, and each physical server executing virtualization software that virtualizes one or more of the physical resources for logical servers that are linked to that physical server; and
   a server cloud manager, interfaced to the plurality of physical servers, that establishes and maintains status and instance information for the plurality of logical servers including the persistent and non-persistent attributes that link each logical server with a physical server.

2. The virtualized logical server cloud of claim 1, wherein the data storage resource comprises a non-volatile storage resource and volatile memory resource.

3. The virtualized logical server cloud of claim 1, further comprising:
   a user database, coupled to the server cloud manager, that includes mapping information between users, the plurality of logical servers and the plurality of physical servers; and
   the server cloud manager including a user interface that enables access and control of any one or more of the physical and logical servers by users;
   wherein the server cloud manager receives user credential information via the user interface and provides control and access of a corresponding one or more of the physical and logical servers.

4. The virtualized logical server cloud of claim 1, further comprising:
   each logical server incorporating a keyboard/video/mouse (KVM) resource;
   the virtualization software of each physical server implementing a virtual KVM function to enable access to each KVM resource of each logical server linked to that physical server; and the server cloud manager providing KVM redirection between a user KVM client and the virtual KVM function of each physical server.

5. The virtualized logical server cloud of claim 1, wherein the persistent attributes include a media access control (MAC) address, a boot disk image, a system identifier, a processor type and access credentials.

6. The virtualized logical server cloud of claim 1, wherein the non-persistent attributes include processor resource information, memory resource information, keyboard/video/mouse (KVM) resources and disk redundancy level.

7. The virtualized logical server cloud of claim 1, wherein each logical server executes a separate operating system.

8. The virtualized logical server cloud of claim 1, further comprising a shared storage system coupled to the network system.

9. The virtualized logical server cloud of claim 1, further comprising:
   each physical server including at least one physical server agent that is controlled by the server cloud manager in order to manage physical resources for each logical server linked to the physical server.

10. The virtualized logical server cloud of claim 1, further comprising:
    each logical server including a logical server agent that extends control of a corresponding logical server to the server cloud manager.

11. The virtualized logical server cloud of claim 1, further comprising:
    each physical server including at least one physical server agent that is controlled by the server cloud manager in order to manage physical resources for each logical server linked to the physical server;
    each logical server including a logical server agent that extends control of each logical server to the server cloud manager; and
    the server cloud manager interfacing and controlling each physical server agent and each logical server agent.

12. The virtualized logical server cloud of claim 1, wherein the server cloud manager orchestrates a move procedure for moving a logical server from a first physical server to a second physical server, and wherein the move procedure includes copying a disk image from the first physical server to the second physical server, copying logical server configuration from the first physical server to the second physical server, and remapping keyboard/video/mouse (KVM) functions from the first physical server to the second physical server.

13. The virtualized logical server cloud of claim 1, further comprising:
    a physical server agent operating on a physical server;
    a virtual keyboard/video/mouse (KVM) function implemented by the virtualization software of the physical server;
    the server cloud manager instructing the physical server agent to replicate a logical server on the physical server, and after the logical server is activated, redirecting a KVM client to the virtual KVM function;
    the physical server agent, as controlled by the server cloud manager, retrieving and locally storing a logical server template, creating logical server configuration information from the logical server template, activating a logical server from the logical server configuration information, and relaying instructions from the server cloud manager to a logical server agent of the activated logical server; and
    the logical server agent completing activation of the logical server via commands from the server cloud manager.

14. The virtualized logical server cloud of claim 1, wherein the server cloud manager operates at a maximum security level with administrative rights over logical server administrative access and multiple physical server administrative access to enable logical server instancing.

15. The method of claim 1, wherein said server cloud manager comprises a peer to peer application distributed among said plurality of physical servers.

16. The virtualized logical server cloud of claim 4, wherein the server cloud manager provides KVM mapping information to the user KVM client that enables direct access to a selected logical server by the user KVM client.

17. The virtualized logical server cloud of claim 4, wherein the server cloud manager comprises:
    a KVM service that interfaces a user KVM client; and
    a KVM client, interfaced to the KVM service and a virtual KVM function of a physical server, that maps KVM functions between the KVM service and the virtual KVM function.

18. The virtualized logical server cloud of claim 5, wherein the persistent attributes further include semi-persistent attributes including an internet protocol (IP) address, a logical name, a server cloud manager identifier, user account information, a non-boot disk image and network connections.

19. The virtualized logical server cloud of claim 8, wherein the shared storage system stores at least one logical server template that is configured to enable replication of a logical server on a physical server.

20. The virtualized logical server cloud of claim 9, wherein the physical server agent runs as a service on an operating system of the physical server.

21. The virtualized logical server cloud of claim 9, wherein each physical server agent is capable of controlling physical server functions and associated physical resources via interfaces to virtualization software of a corresponding physical server.

22. The virtualized logical server cloud of claim 10, wherein at least one logical server agent runs as a service on an operating system of the corresponding logical server.

23. The virtualized logical server cloud of claim 12, wherein the move procedure includes remapping network requests for the moved logical server from the first physical server to the second physical server.

24. The virtualized logical server cloud of claim 14, wherein said logical server instancing includes moving a logical server from a first physical server to a second physical server.

25. A server cloud management system that virtualizes a plurality of logical servers of a plurality of physical servers into a logical server cloud, comprising:
    virtualization software, executed on each physical server, that enables linkage of logical servers with the physical servers;
    an attribute database that maintains status and instance information for each of the plurality of logical servers including persistent and non-persistent attributes of each logical server;
    a user database that includes mapping information between users, the plurality of logical servers and the physical servers;
    a user interface that establishes a portal for users and that receives user credential information; and a server cloud manager, interfaced to the virtualization software, the attribute database, the user database and the user interface, that provides access to and control of a logical server by a user session from which valid user credential information is received.

26. The server cloud management system of claim 25, further comprising:

each physical server executing a physical server agent, interfaced to the server cloud manager, that enables management of physical resources for each logical server linked to a corresponding physical server.

27. The server cloud management system of claim 25, further comprising:

each logical server executing a logical server agent, interfaced to the server cloud manager, that enables management and control of logical attributes of the logical server by the server cloud manager.

28. The server cloud management system of claim 25, wherein the server cloud manager operates at a maximum security level with administrative rights over logical server administrative access and multiple physical server administrative access to enable logical server instancing.

29. A method of virtualizing a plurality of logical servers into a logical server cloud linked to a plurality of physical servers, comprising:

providing a virtual keyboard/video/mouse (KVM) function on each physical server for mapping KVM information to logical servers linked to the physical server;

maintaining attributes of each logical server by a server cloud manager interfaced to the plurality of physical servers, the attributes establishing an identity of and defining resources for each logical server;

mapping, by the server cloud manager, each logical server with a physical server and user information;

forwarding, by the server cloud manager, KVM information between remote clients and the virtual KVM functions of each physical server; and managing, by the server cloud manager via a physical server agent, physical resources of a physical server on behalf of each logical server linked to that physical server.

30. The method of claim 29, further comprising:

managing, by the server cloud manager via a logical server agent executing on a logical server, logical attributes of the logical server.

31. The method of claim 29, further comprising moving a logical server from a first physical server to a second physical server, including copying a disk image from the first physical server to the second physical server, copying a logical server configuration from the first physical server to the second physical server, and remapping KVM functions from the first physical server to the second physical server.

32. The method of claim 31, wherein said moving further comprises remapping network requests for the moved logical server from the first physical server to the second physical server.

33. The method of claim 29, further comprising replicating a logical server on a physical server, including retrieving and storing a logical server template on the physical server, creating logical server configuration information from the logical server template, activating a logical server from the logical server configuration information, linking a logical server agent on the activated logical server with the server cloud manager, and redirecting a KVM client to the virtual KVM function of the physical server.

34. The method of claim 33, wherein said replicating further comprises creating a unique identity for the replicated logical server.

35. The method of claim 33, wherein said replicating further comprises mapping network requests for the replicated logical server.

* * * * *